United States Patent
Hsu et al.

(10) Patent No.: US 10,805,902 B1
(45) Date of Patent: Oct. 13, 2020

(54) CHAINED WIRELESS COMMUNICATION SYSTEM AND METHOD FOR PROCESSING SIGNALS

(71) Applicant: HONEYWLD TECHNOLOGY CORP., Hsinchu (TW)

(72) Inventors: Jen-Chien Hsu, Hsinchu (TW); Ching-Chang Lin, Hsinchu (TW)

(73) Assignee: HONEYWLD TECHNOLOGY CORP., Hsinchu (TW)

( * ) Notice: Subject to any disclaimer, the term of this patent is extended or adjusted under 35 U.S.C. 154(b) by 0 days.

(21) Appl. No.: 16/543,460

(22) Filed: Aug. 16, 2019

(51) Int. Cl.
*H04L 12/761* (2013.01)
*H04W 40/24* (2009.01)
*H04W 64/00* (2009.01)
*H04B 17/318* (2015.01)
*H04W 76/50* (2018.01)
*H04W 4/38* (2018.01)

(52) U.S. Cl.
CPC ........ *H04W 64/006* (2013.01); *H04B 17/318* (2015.01); *H04L 45/16* (2013.01); *H04W 4/38* (2018.02); *H04W 40/244* (2013.01); *H04W 76/50* (2018.02)

(58) Field of Classification Search
CPC ..... H04W 64/006; H04W 76/50; H04W 4/38; H04W 40/244; H04L 45/16; H04B 17/318
See application file for complete search history.

(56) References Cited

U.S. PATENT DOCUMENTS

| 2018/0288563 | A1* | 10/2018 | Krzych | H04W 4/50 |
| 2019/0159044 | A1* | 5/2019 | Abou-Rizk | H04W 24/02 |
| 2019/0294809 | A1* | 9/2019 | Newsom, III | G06F 21/6218 |

* cited by examiner

*Primary Examiner* — Marisol Figueroa
(74) *Attorney, Agent, or Firm* — Li & Cai Intellectual Property (USA) Office

(57) ABSTRACT

A chained wireless communication system is provided. The system includes a main node and a plurality of communication nodes. The communication nodes are chained to form a chain network. The communication node can switch roles among a master connection unit, a slave connection unit and a signal scanning unit. The signal scanning unit can scan nearby terminal devices and generate scan packets. The scan packets are transmitted to neighboring communication nodes via the slave connection unit. The master connection unit of the neighboring communication node receives the scan packets. The scan packets are then delivered to the main node via this chain network. The main node retrieves a message delivered from the terminal device according to an identification message from the scan packets. The message delivered from the terminal device is used to locate the terminal device, notify an emergency event or serve as a sensing signal.

8 Claims, 5 Drawing Sheets

CHAINED WIRELESS COMMUNICATION SYSTEM AND METHOD FOR PROCESSING SIGNALS

FIELD OF THE DISCLOSURE

The disclosure is generally related to a communication system, and in particular to a chained wireless communication system having a plurality of communication nodes that serve various roles, and a method for processing signals thereof.

BACKGROUND OF THE DISCLOSURE

The technical specification of Bluetooth Low Energy (BLE) standard defines a low-throughput data transmission method for reducing power consumption and increasing battery life. The BLE device is in a standby state for most of time when operating. The BLE chip can complete data transmission in a few milliseconds and return to the standby state.

The device that complies with BLE standard can be classified into several types, such as a BLE central device or a BLE peripheral device, and can be used in some specific application, e.g. Internet of Things (IoT). The BLE central device and a plurality of BLE peripheral devices associated with the central device can constitute a radial network. FIG. 1 shows a conventional framework of the radial network of the BLE devices.

A gateway device 10 is provided in the diagram for allowing the devices in an internal network to connect with an external network. In the network in compliance with BLE standard, the gateway device 10 can act as a role such as the BLE central device that is used to connect with the BLE peripheral devices 101, 102 and 103 within the internal network.

A network system with the BLE devices is able to perform a positioning function. For example, the BLE peripheral devices 101, 102 and 103 serve as the positioning nodes within the internal network. These positioning nodes transmit signals broadcasted by a moving object 12 to the gateway device 10.

The gateway device 10 or any external host can accordingly estimate the position of the moving object 12 based on the signals.

SUMMARY OF THE DISCLOSURE

In response to the above-referenced technical inadequacies, the present disclosure provides a chained wireless communication system and a method for processing signals of the same. The chained wireless communication system includes a main node for connecting with an external network, and a plurality of communication nodes. The main node and the plurality of communication nodes are chained to form a chain network.

In one embodiment, the communication node serves multiple roles in the system. The main circuit components of the communication node include a control unit, a master connection unit, a slave connection unit and a signal scanning unit that are electrically connected with the main circuit. The communication node also includes a memory unit that is used to store identification data with respect to the communication node. The signal scanning unit of the communication node is used to scan broadcast packets generated by one or more neighboring terminal devices. The slave connection unit of the communication node then transmits scan packets to another neighboring communication node, and the master connection unit of the neighboring communication node receives the scan packets. The scan packets are finally delivered to the main node via the chain network. The main node can therefore analyze information carried by the scan packets that includes one or more messages, identification data of the communication node and identification data of the terminal device.

For example, the messages delivered between the communication nodes are such as received signal strength that is used to estimate the location of the terminal device. The communication node is configured to be a sensor node. The messages delivered among the communication nodes are sensing signals. When the communication node serves as a data collector, the messages delivered among the communication units are data.

Furthermore, the main node includes a processing unit, a master connection unit and main node network unit. The main node network unit is used to connect with an external network. The master connection unit is used to receive scan packets delivered via the chain network. When the scan packets are processed by the processing unit, the information delivered by the terminal device can be obtained from the scan packets. The terminal device can be located according to received signal strengths received by one or more communication nodes. The continuous messages generated by the terminal device allow the system to acquire a trajectory of the terminal devices.

The terminal device is an electronic device that is able to generate an emergency signal. The terminal device is triggered to generate the emergency signal, which can be issued through broadcast packets. The emergency signal is delivered to the main node via the chain network. The emergency signal is then transmitted to a host of an external network so as to perform corresponding measures according to the positioning data.

In one embodiment, the chained wireless communication system embodies a BLE system. The communication node of the system plays multiple roles including a central circuit, a peripheral circuit and a scan circuit of the BLE system.

In an embodiment of the method for processing signals in the chained wireless communication system, one or more communication nodes of the chained wireless communication system receives the broadcast packets generated by the terminal device. The slave connection unit of each of the communication nodes transmits scan packets to a master connection unit of neighboring communication node. After the neighboring communication node receives the scan packets, a slave connection unit of the communication node transmits the scan packets to the master connection unit of a neighboring communication node. The scan packets are then delivered to the main node over the chain network in an order. The main node interprets the scan packet and knows which terminal device is sending the signal and the position of the terminal device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present invention will now be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The disclosure is related to a chained wireless communication system and a method for processing signals. The chained wireless communication system includes a main node that can serve as a gateway for interlinking an external network from the chained wireless communication system. The main node can also be used to process the signals generated by other nodes of the chained wireless communication system. The chained wireless communication system includes a plurality of communication nodes. The plurality of communication nodes and the main node are interlinked to form a chain network. When the chained wireless communication system is set up at a specific venue to form a local area network (LAN), various terminal devices in the LAN can be located through the plurality of communication nodes disposed at different locations. Each of the communication nodes is configured to be a multi-role device that can be used to receive data, to transmit data, and to scanning devices.

Figure 1:
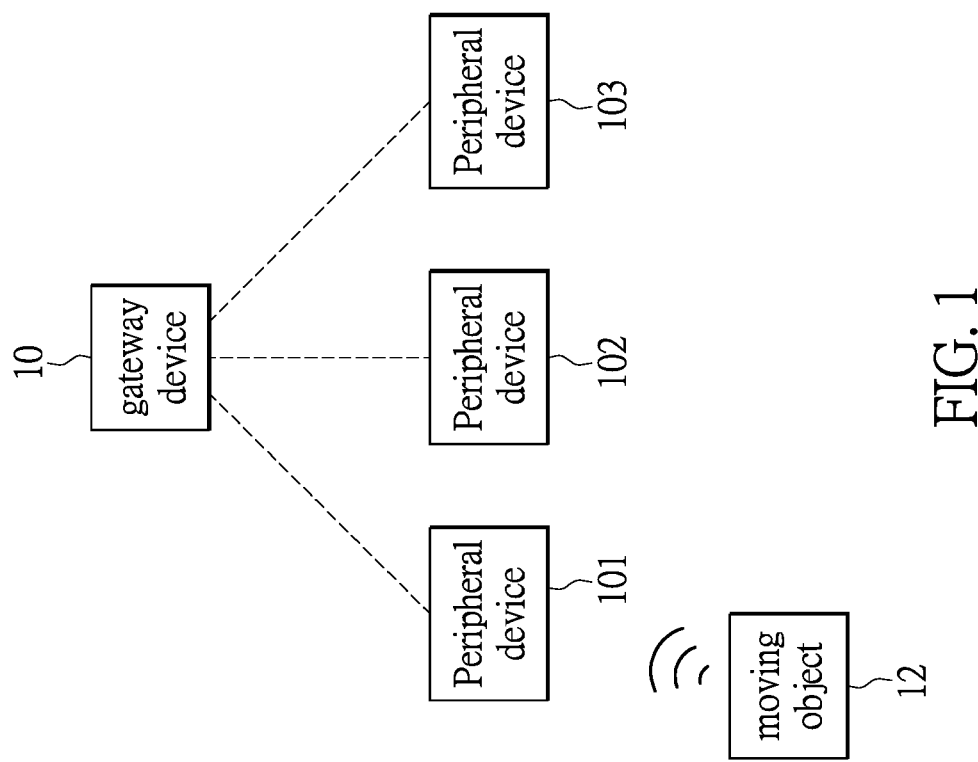
FIG. 1 shows a schematic diagram depicting a positioning technology using BLE technology.
Figure 2:
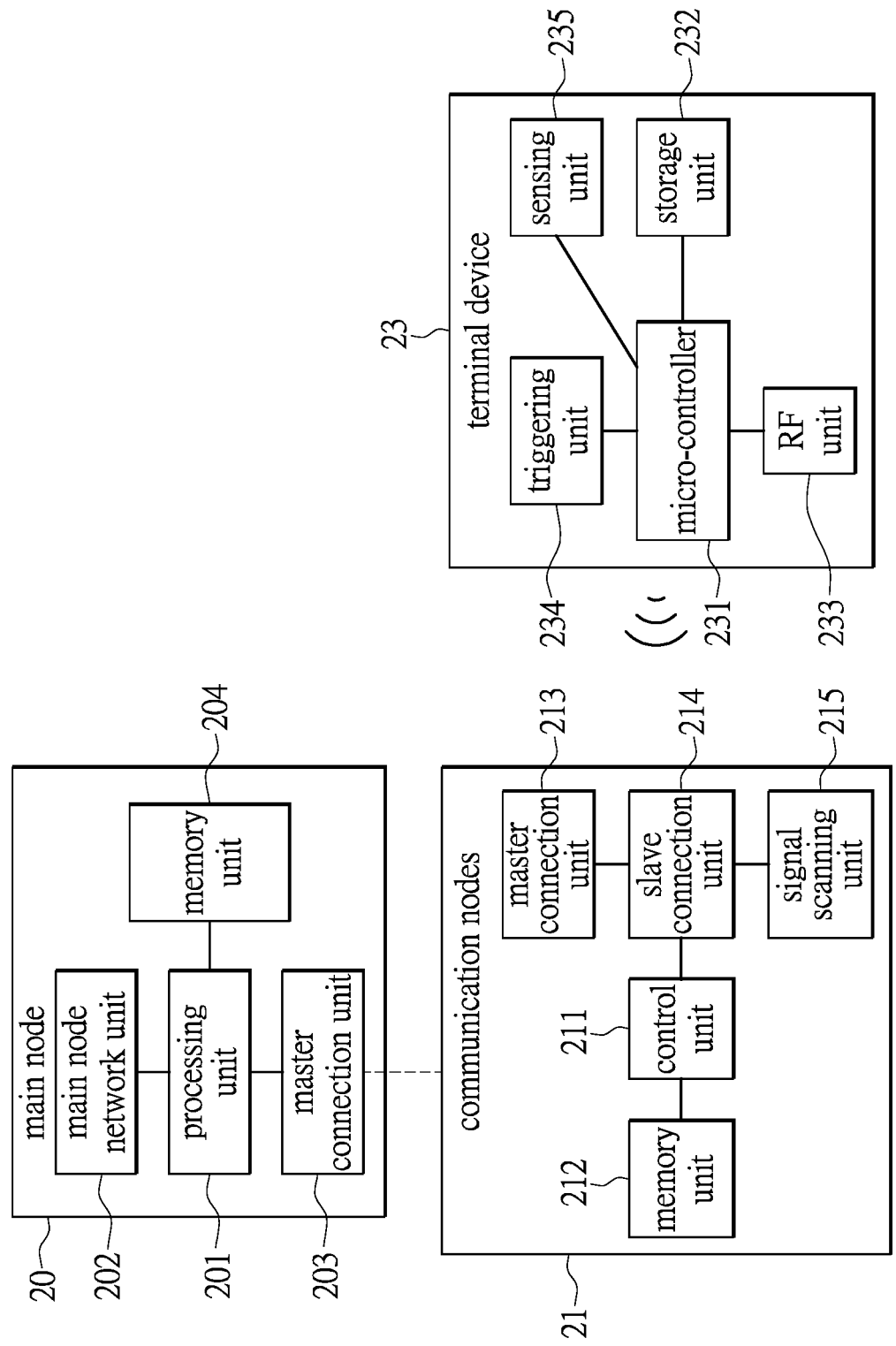
FIG. 2 shows a system framework of a chained wireless communication system in one embodiment of the disclosure.

Reference is made to FIG. 2, which shows a system framework of the chained wireless communication system according to one embodiment of the disclosure. A main node 20, one of the communication nodes 21 and a terminal device 23 are schematically shown in the diagram.

The main circuit components of the main node 20 primarily include a processing unit 201 that can analyze signals transmitted from other nodes of the system, and process message generated by the terminal device 23; and a main node network unit 202, a master connection unit 203 and a memory unit 204 that are electrically connected with the main node 20.

The main node network unit 202 can be a network circuit used to connect with an external wired or wireless network (not shown in the diagram). The master connection unit 203 is used to connect with an internal node, e.g. the communication node 21. The master connection unit 203 is used to receive the scan packets transmitted via the chain network, and temporarily store the packets into the memory unit 204.

In the main node 20, when the master connection unit 203 receives the scan packets, the processing unit 201 obtains a message sent by the terminal device 23 according to message carried by the scan packets.

For example, if a Received Signal Strength Indicator (RSSI) is obtained from the scan packets, a software process operated in the processing unit 201 estimates the distance between the communication nodes 21 and the terminal device 23. This distance can be estimated according to a comparison of distances and multiple levels of the received signal strengths. Therefore, the position of the terminal device 23 can be roughly estimated. The broadcast packets generated by the terminal device 23 can be received by one or more communication nodes 21 if the terminal device 23 is near one of the communication nodes 21. The main node 20 can accordingly estimate the distance according to the received signal strengths from the plurality of communication nodes 21 to the terminal device 23. The position of the terminal device 23 can be estimated more accurately based on the locations of the plurality of communication nodes 21.

The present example uses only one communication node 21 to describe a chain network that includes a plurality of communication nodes 21 in practice. The communication nodes 21 can be interlinked by a wireless communication protocol.

The main circuit components of the communication node 21 primarily includes a control unit 211, a master connection unit 213, a slave connection unit 214, a signal scanning unit 215 and a memory unit 212 that are electrically connected with the control unit 211. The memory unit 212 is used to store identification data with respect to the communication node.

In one embodiment of the chained wireless communication system, the communication node 21 over the chain network serves different roles. For example, the control unit 211 of the communication node 21 switches on the signal scanning unit 215 for scanning one or more neighboring terminal devices 23. The terminal device 23 generates broadcast packets. The nearby communication node 21 can sense the terminal device 23 through the broadcast packets. After one or more communication nodes 21 senses the broadcast packets generated by the terminal device 23, one or more communication nodes 21 generate scan packets and delivers the packets to the main node 20 via the chain network.

The control unit 211 switches on the slave connection unit 214 for transmitting scan packets to its neighboring communication node, and switch on the master connection unit 213 for receiving packets transmitted from another communication node. The neighboring communication node that receives the scan packets is such as the shown communication node 21. The neighboring communication node also has its control unit that can switch on the master connection unit for receiving the scan packets.

Every communication node over the chain network can serve multiple functions such as scanning, transmitting and receiving. The packets are transmitted by the slave connection unit of one communication node to the master connection unit of the next communication node. The scan packets are delivered via the chain network until the packets are transmitted to a main node 20. Finally, the main node 20 analyzes the information in the scan packets and executes some specific functions.

In the current embodiment, the terminal device 23 can be an electronic device that is able to issue messages via a radio-frequency (RF) channel. The terminal device 23 includes a micro-controller 231 that controls operations of the terminal device 23, and other circuit components electrically connected with the micro-controller 231. The other circuit components are such as a storage unit 232 and a radio-frequency unit (RF unit) 233.

The storage unit 232 is used to store a device identifier (device ID) with respect to the terminal device 23, and the messages to be transmitted. The messages may be related to an emergency message and sensing data. The RF unit 233 is used to generate broadcast packets. The broadcast packets carry the device identifier stored in the storage unit 232, and advertisement data. The advertisement data includes messages such as emergency messages or sensing data.

In an exemplary example, the terminal device 23 can be a wearable device for a person or a portable device. The terminal device 23 has an interface for triggering the internal triggering unit 234 to generate signals. The triggering unit 234 is electrically connected with the micro-controller 231. The triggering unit 234 can be triggered to issue an emergency signal. The emergency signal is carried by the broadcast packets and received by the communication node 21. The emergency signal is delivered to the main node 20 via the chain network, and finally transmitted to a host of an external network. For example, the terminal device 23 can be worn by a person under care. When the person under care suffers an emergency event, the terminal device 23 can automatically generate the emergency signal or can be manually activated to generate the emergency signal. The emergency signal is transmitted to a care system in the external network via the chained wireless communication system. The care system can quickly locate the person under care and perform corresponding measures.

In one further embodiment of the disclosure, the terminal device 23 implements a sensor node. A sensing unit 235 is provided in the terminal device 23 for sensing environmental events, physiological events or for other specific purposes. A sensing signal is generated and issued through the broadcast packets. The sensing signal is then delivered to the main node 20 via the chain network, and next transmitted to a host of an external network.

It should be noted that the chained wireless communication system embodies a BLE-based LAN. The related BLE system conducts a specific task. The task is such as locating, environment sensing, or data collection. The communication node of the chained wireless communication system plays the role of a BLE device. The master connection unit of the communication node serves as a central circuit operated in the BLE system for receiving signals. The slave connection unit of the communication node serves as a peripheral circuit of the BLE system for transmitting signals. The signal scanning unit of the communication node operates as a scan circuit of the BLE system.

The communication node of the chained wireless communication system plays the role of a multi-role BLE device that integrates the central circuit, the peripheral circuit and the scan circuit of the BLE system. The communication node also serves as a positioning node, a data collector or a sensor node of the BLE system.

Figure 3:
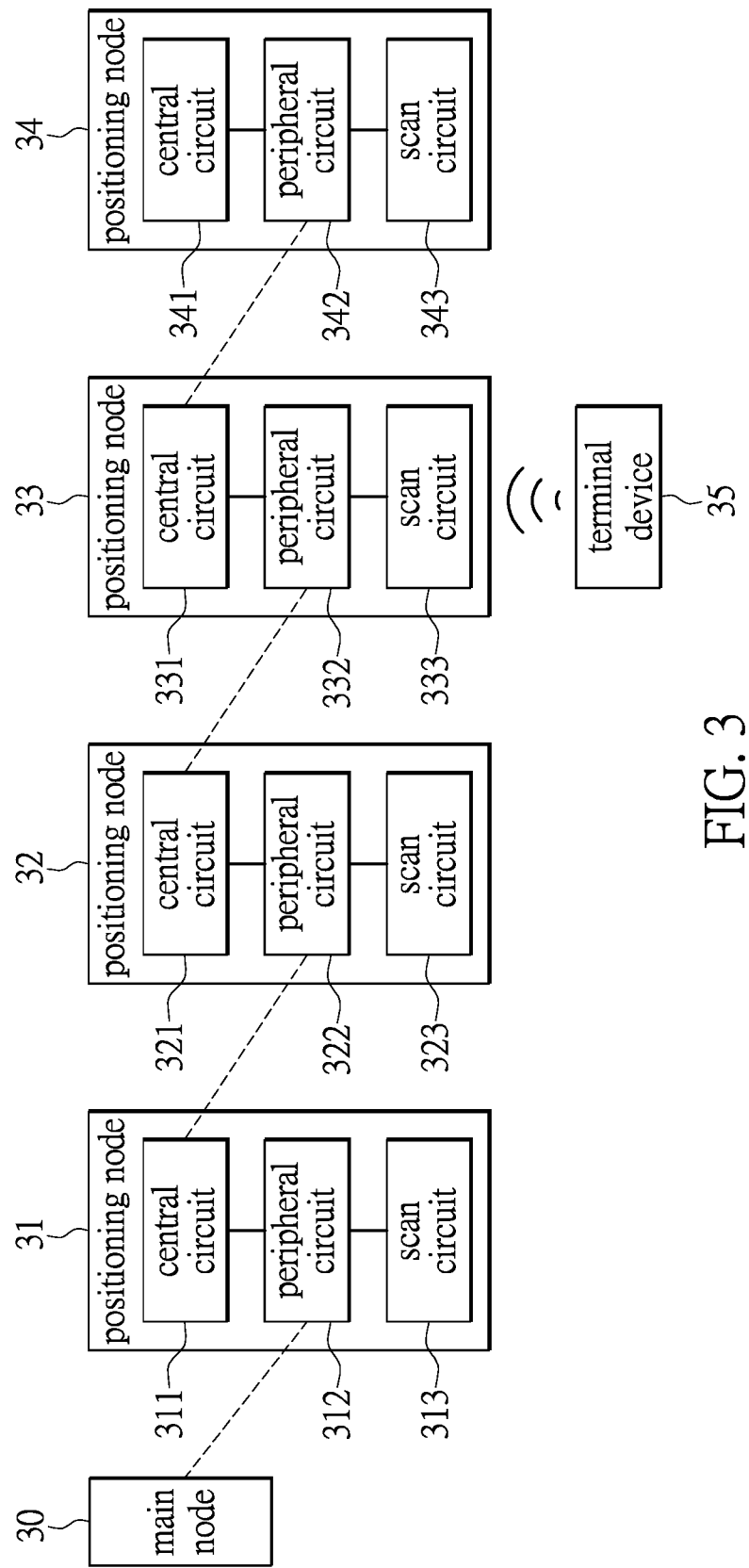
FIG. 3 shows a schematic diagram depicting the chained wireless communication system used to locate a terminal device according to one embodiment of the disclosure.

FIG. 3 shows a schematic diagram depicting a BLE system implemented by the chained wireless communication system for performing positioning process in one embodiment of the disclosure.

In the diagram, a main node 30 and a plurality of communication nodes that implement the positioning nodes 31, 32, 33 and 34 constitute a communication system. The main node 30 serves as a gateway providing service for internal network devices to connect with an external network for the chained wireless communication system. The network framework in compliance with BLE protocol uses the main node 30 to play a role of BLE central device of the BLE system. The BLE central device (Central) connects with a plurality of BLE peripheral devices (Peripheral) within the LAN. The BLE peripheral devices are such as the positioning nodes 31, 32, 33 and 34 shown in the diagram. The positioning nodes 31, 32, 33 and 34 are in charge of locating a nearby terminal device 35. The positioning nodes 31, 32, 33 and 34 sense the broadcast packets generated by the terminal device 35 and also receive the Received Signal Strength Indicators (RSSIs). The positioning nodes 31, 32, 33 and 34 accordingly generate scan packets. The scan packets are delivered to the main node 30 via the chain network. The main node 30 analyzes information carried by the scan packets so as to locate the terminal device 35. The information extracted from the scan packets can be transmitted to a host of an external device.

The diagram depicts circuit blocks of the positioning nodes 31, 32, 33 and 34. For example, the positioning node 31 primarily includes a central circuit 311, a peripheral circuit 312 and a scan circuit 313. The positioning nodes 31, 32, 33 and 34 form a chain network. The nodes can be communicated with each other using BLE communication protocol. The chained wireless communication system can therefore be in operation under a low power consumption and long standby mechanism. The scan circuits (313, 323, 333, 343) of the positioning nodes (31, 32, 33, 34) continuously scan signals from the terminal device 35 to check if any terminal device 35 is nearby. When receiving broadcast packets from the terminal device 35, the peripheral circuits (312, 322, 332, 342) transmit scan packets to the central circuits (311, 321, 331, 341) of their neighboring positioning nodes in the chain network and transmit the packets to the main node in an order. It should be noted that the number of the terminal devices 35 is not limited to any number.

As shown in the diagram, the terminal device 35 is near the positioning node 33, namely a closest distance from the positioning node 33. The terminal 35 is a little far distance from the positioning nodes 32 and 34. In practice, the positioning nodes 32, 33 and 34 may sense the presence of the terminal device 35. The distance there-between can be calculated according to the received signal strengths between the terminal device 35 and its neighboring positioning nodes 32, 33 and 34.

In this example, the positioning nodes 32, 33 and 34 generate scan packets if the terminal device 35 is detected according to a scanning result. The positioning nodes 31, 32, 33 and 34 transmit the scan packets using a BLE protocol. For example, the scan circuit 333 of the positioning node 33 receives broadcast packets generated by the terminal device 35. The peripheral circuit 332 of the positioning node 33 transmits scan packets that contains identification data of the terminal device 35 and a received signal strength to the positioning node 32 via the chain network. The central circuit 321 of the positioning node 32 receives the scan packets. After that, the control circuit (not shown) of the positioning node 32 is configured to switch on the peripheral circuit 322 for transmitting the scan packets to the next positioning node 31 via the chain network. The central circuit 311 of the positioning node 31 receives the scan packets. The positioning node 31 then switched on the peripheral circuit 312 for transmitting the scan packets to the main node 30. In the meantime, the scan circuit 323 of the positioning node 32 may also receive the broadcast packets generated by the terminal device 35. Therefore, the peripheral circuit 322 of the positioning node 32 transmits scan packets containing the identification data of the terminal device 35 and a corresponding received signal strength to the positioning node 31 via the chain network. The central circuit 311 of the positioning node 31 receives the scan packets. The control circuit of the positioning node 31 immediately switches on the peripheral circuit 312 to transmit the scan packets to the main node 30. Similarly, the scan circuit 343 of the positioning node 34 may also receive the broadcast packets from the terminal device 35, and the corresponding scan packets are then delivered to the main node 30 via the chain network.

The main node 30 analyzes the scan packets when receiving the scan packets delivered by the plurality of positioning nodes 31, 32, 33 and 34 via the chain network. The main node 30 can obtain received signal strength between the terminal device 35 and each of the positioning nodes 32, 33 and 34. Therefore, the main node 30 can locate the terminal device 35 according to the received signal strengths and the locations of the positioning nodes 32, 33 and 34.

In one embodiment of the disclosure, the terminal device 35 can be a wearable electronic device for the person under care. The terminal device 35 allows the person under care to be located by an external system anytime, e.g. a care system. Further, the terminal device 35 can be equipped with an emergency button, or a physiological sensor. When the person under care suffers an emergency event, an emergency signal is generated by manually pressing the emergency button or generated by the physiological sensor automatically. The emergency signal is delivered to the external care system from the chained wireless communication system. The care system then locates the person under care for providing timely assistance.

In one further embodiment, the chained wireless communication system is used for data transmission. The chained wireless communication system locates the terminal device 35 and collects data generated by the terminal device 35. For example, the system can collect sensing data while sensing the environmental events. Therefore, the system can continuously obtain the physiological data from the person under care when combined with the above embodiments.

Figure 4:
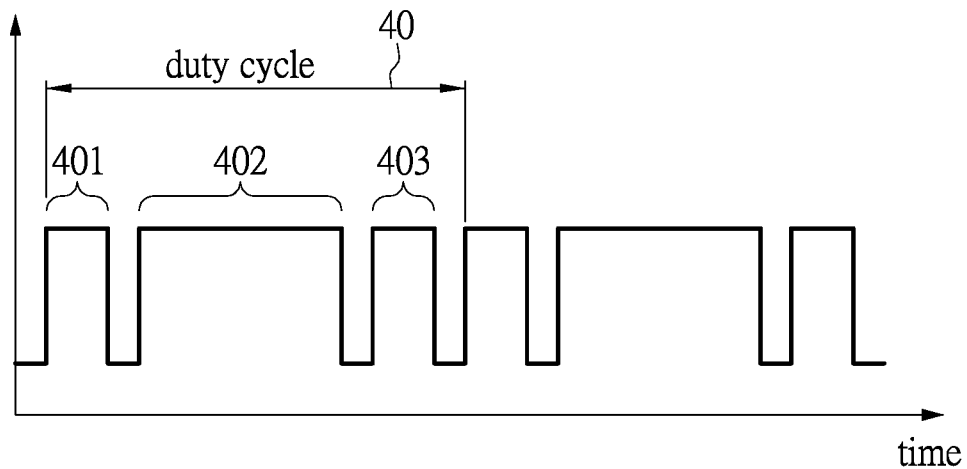
FIG. 4 shows a schematic diagram of a timeline for depicting signal processing in a communication node of the chained wireless communication system according to one embodiment of the disclosure.

When the chained wireless communication system operates as the BLE system, each of the communication nodes of the system can play the roles of central, scanner or peripheral of the BLE system. The control circuit of the system is used to switch the roles of the system. Reference is made to FIG. 4 showing a schematic diagram of a time line for depicting signal processing in the communication node of the chained wireless communication system according to one embodiment of the disclosure.

Specifically, FIG. 4 shows a duty cycle 40 of the communication node. The duty cycle 40 includes a cycle of receiving (401), a cycle of scanning (402) and a cycle of transmitting (403) that operate in sequence. The chained wireless communication system uses the master connection unit to receive signals in a receiving period 401, uses the signal scanning unit to scan signals in a scanning period 402, and uses the slave connection unit to transmit signals in a transmitting period 403 within the duty cycle 40.

Figure 5A:
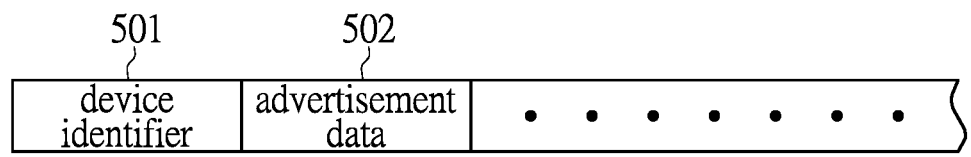
FIG. 5A and FIG. 5B shows schematic diagrams depicting broadcast packets and scan packets rendered in the chained wireless communication system according to one embodiment of the disclosure.
Figure 5B:
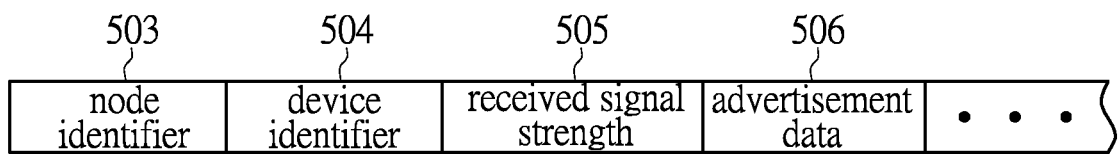

The chained wireless communication system relies on the scan packets delivered among the communication nodes to obtain information transmitted by the terminal device. FIG. 5A and FIG. 5B show schematic diagrams of the scan packets transmitted in the chained wireless communication system.

FIG. 5A exemplarily shows content of the broadcast packet generated by the terminal device. A device identifier 501 of the terminal device, an advertisement data 502 and others are contained in the packet. The terminal device broadcasts the packet. One or more communication nodes within a signaling range receive the broadcast packet. FIG. 5B exemplarily shows the content of a scan packet transmitted among the communication nodes. The scan packet is generated by one of the communication nodes when the communication node senses the terminal device. A node identifier (node ID) 503 of the communication node, a device identifier (device ID) 504 of the terminal device, a received signal strength 505 between the terminal device and the communication node, and the advertisement data 506 are contained in the packet. The main node of the chained wireless communication system uses these messages for various applications.

Figure 6:
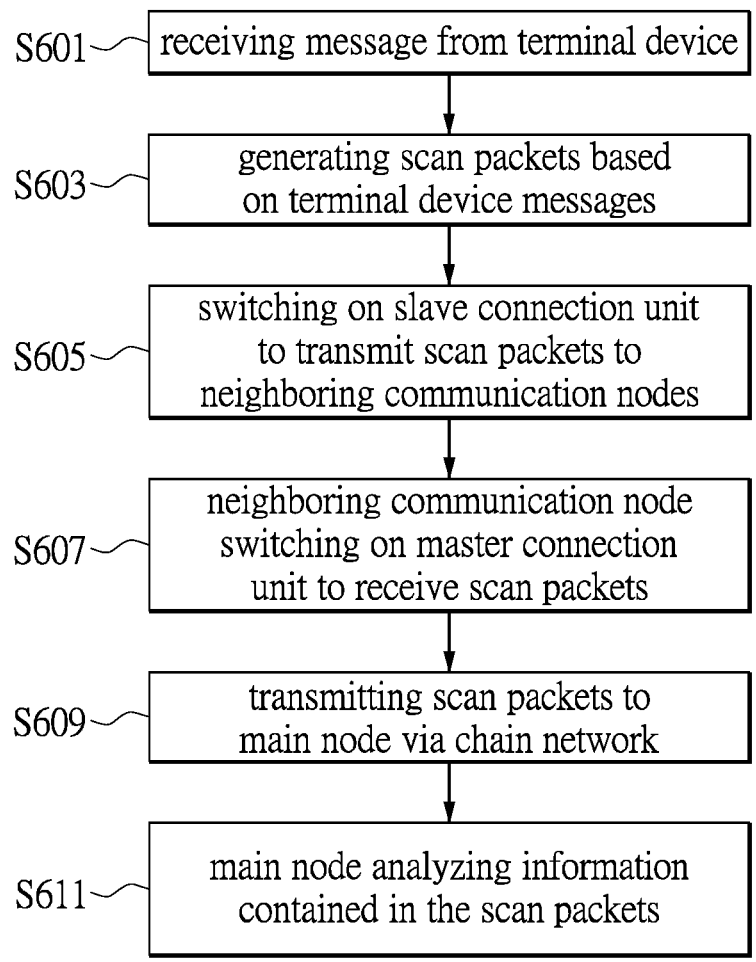
FIG. 6 shows a flow chart describing a process for processing signals in the chained wireless communication system in one embodiment of the disclosure.

FIG. 6 shows a flow chart describing method for processing signals of the chained wireless communication system in one embodiment of the disclosure. In step S601, one or more communication nodes receive the messages generated by the terminal device. In step S603, one or more communication nodes generate scan packets based on the messages sent by the terminal device. The scan packet generally contains identification data, e.g. node ID (503) of the communication node, and also the identification data, e.g. the device ID (504) of the terminal device.

After that, such as in step S605, a control unit of the communication node that receives messages from the terminal device switches on the slave connection unit of the communication node to transmit scan packets to neighboring communication node(s). In step S607, when the neighboring communication node receives a request of transmission, the control unit of the neighboring communication node switches on the master connection unit to receive the scan packets. The communication nodes over the chain network complete transmitting scan packets by the above procedure. In step S609, the scan packets are delivered via the chain network to the main node. The main node analyzes information contained in the scan packets (step S611).

In the main node, according to one embodiment in view of FIG. 2, the master connection unit of the main node is used to receive scan packets delivered via the chain network, and the processing unit extracts information from the scan packets, such as the received signal strengths between the terminal device and the corresponding communication nodes, therefore locates the terminal device.

Optionally, if the main node continuously receives scan packets with the information of the terminal device, the system can acquire a trajectory of the terminal device by continuously locating the terminal device.

To sum up, the chained wireless communication system includes a plurality of communication nodes that are interlinked with each other so as to form a chain network. Each of the communication nodes can play multiple roles in the system. A control unit of the communication node is used to switch the roles by controlling the internal circuit components. For example, the communication node can switch on the signal scanning unit to scan the nearby terminal device, and switch on the slave connection unit to transmit scan packets. The master connection unit of the neighboring communication node receives the scan packets, which are then delivered to the main node via the chain network. The main node locates the terminal device, processes emergency signals or sensing data according to information carried by the scan packets.

What is claimed is:

1. A chained wireless communication system, comprising:
a main node, used to connect with an external network and neighboring communication nodes, wherein the main node includes a processing unit, a master connection unit that is used to receive scan packets broadcasted via a chain network, and a main node network unit that is used to connect with the external network; and
a plurality of communication nodes, each of which serves as a multi-role device and is used to scan, transmit and receive signals, wherein each of the communication nodes receives and scans broadcast packets generated by one or more terminal devices, the plurality of communication nodes switch roles for transmitting or receiving signals by a control circuit so as to be interconnected for forming the chain network, and the signals are delivered to the main node in an order;
wherein the communication node includes: a control unit, a master connection unit of the communication node, a slave connection unit, a signal scanning unit, and a memory that are electrically connected with the control unit wherein the memory unit is used to store identification data of the communication node; the communication node switches on the signal scanning unit to scan one or more neighboring terminal devices by generating scan packets, and switches on the slave connection unit to transmit the scan packets to a neighboring communication node; the neighboring communication node switches on the master connection unit to receive the scan packets, and transmits the scan packets via the chain network until the packets are transmitted to the main node; and the main node analyzes information transmitted by the terminal device according to the identification data of the communication node and the terminal device carried by the received scan packets.

2. The system according to claim 1, wherein the processing unit of the main node obtains received signal strengths of one or more communication nodes from the terminal device according to messages carried by the scan packets so as to estimate a position and a trajectory of the terminal device.

3. The system according to claim 1, wherein the signal scanning unit of the communication node scans one or more neighboring terminal devices for obtaining advertisement data of the broadcast packets generated by each of the terminal devices; the advertisement data includes emergency signals or sensing signals transmitted by the terminal device; and the advertisement data is added to the scan packets that are sequentially delivered to the main node via the chain network.

4. The system according to claim 1, wherein the signal scanning unit of the communication node scans one or more neighboring terminal devices and detects a received signal strength between the terminal device and the communication node; the received signal strength is added to the scan packets, and the scan packets are sequentially delivered to the main node via the chain network.

5. The system according to claim 1, wherein the chained wireless communication system includes the terminal device that includes a micro-controller, a storage unit and an RF unit that are electrically connected with the micro-controller; wherein the RF unit is used to generate broadcast packets that contain a device identifier and advertisement data stored in the storage unit.

6. The system according to claim 5, wherein the terminal device includes a triggering unit that is triggered to generate an emergency signal; the emergency signal is issued via the advertisement data of the broadcast packets, and delivered to the main node via the chain network; and the emergency signal is then transmitted to a host of the external network.

7. The system according to claim 5, wherein the terminal device further includes a sensing unit that generates a sensing signal; the sensing signal is issued via the advertisement data of the broadcast packets, and delivered to the main node via the chain network; and the sensing signal is then transmitted to a host of the external network.

8. The system according to claim 1, wherein the chained wireless communication system embodies a BLE (Bluetooth Low Energy) system; wherein the main node includes a central circuit operated in the BLE system, and the central circuit is interlinked with a peripheral circuit of a neighboring communication node and receives signals from the communication node; the communication node serves as multiple roles including the central circuit, the peripheral circuit and a scanning circuit of the BLE system; the communication node switches the roles between the central circuit and the peripheral circuit to interlink with the neighboring communication node so as to form the chained wireless communication system, and switches on the scan circuit for obtaining broadcast packets generated by the terminal device; wherein the terminal device is a broadcast circuit operated in the BLE system for issuing broadcast packets that are received by the scan circuit of the communication node.

* * * * *